United States Patent
Jain

(10) Patent No.: US 10,419,308 B2
(45) Date of Patent: Sep. 17, 2019

(54) MONITORING IOT GATEWAYS

(71) Applicant: SAP SE, Walldorf (DE)

(72) Inventor: Shashank Mohan Jain, Bangalore (IN)

(73) Assignee: SAP SE, Walldorf (DE)

( * ) Notice: Subject to any disclaimer, the term of this patent is extended or adjusted under 35 U.S.C. 154(b) by 227 days.

(21) Appl. No.: 15/706,791

(22) Filed: Sep. 18, 2017

(65) Prior Publication Data

US 2019/0089607 A1  Mar. 21, 2019

(51) Int. Cl.
  *G06F 15/173* (2006.01)
  *H04L 12/26* (2006.01)
  *H04L 12/66* (2006.01)

(52) U.S. Cl.
  CPC ............ *H04L 43/065* (2013.01); *H04L 12/66* (2013.01); *H04L 43/0817* (2013.01); *H04L 43/0852* (2013.01); *H04L 43/045* (2013.01)

(58) Field of Classification Search
  CPC ..................... H04L 43/065; H04L 43/0817
  See application file for complete search history.

(56) References Cited

U.S. PATENT DOCUMENTS

2018/0198641 A1* 7/2018 Gilani .................. G08B 25/08
2018/0234266 A1* 8/2018 Rudolph ............... H04L 65/102

* cited by examiner

*Primary Examiner* — Hua Fan
(74) *Attorney, Agent, or Firm* — Buckley, Maschoff & Talwalkar LLC

(57) ABSTRACT

Various embodiments of systems and methods for monitoring IoT gateways are described herein. The method includes rendering an option to operate an internet of things (IoT) gateway in one of a profile and a normal mode. When the profile mode is selected, a profiling agent is attached to the IoT gateway to captured one or more gateway attributes indicative of performance of at least one of a software application and one or more processes executing within the software application of the IoT gateway. The captured gateway attributes are sent to a server or cloud for further analysis and processing, e.g., to improve software application executing within the IoT gateway to enhance the performance of the IoT gateway. When the normal mode is selected, a program to capture one or more hardware attributes of the IoT gateway is executed to capture hardware attributes to analyze the performance of the IoT gateway.

20 Claims, 6 Drawing Sheets

MONITORING IOT GATEWAYS

BACKGROUND

"Internet of things (IoT) gateway" refers to a device which is an interface between an on-premise IoT device(s) and cloud. An IoT gateway collects data from one or more IoT devices and sends the collected data onto the cloud, e.g., for processing and analysis. The IoT gateway may include software to pre-process (e.g., filter) the collected data prior to sending the data onto the cloud. Often, the data is voluminous and the IoT gateway has limited hardware resources to pre-process the data, therefore, usually, there is performance or bottleneck issues at the IoT gateway. For example, the IoT gateway may consume more time, than expected, in pre-processing the collected data and/or sending the data onto the cloud. The performance issues may be analyzed by capturing or collecting software and/or hardware logs. A software log provides information on execution time of the software and a hardware log provides information on hardware utilization (e.g., central processing unit (CPU) utilization, memory consumed, etc.) of the IoT gateway. The software and hardware logs are collected separately.

Codes for collecting the logs are stored within the IoT gateway and consumes some resources (e.g., memory) of the IoT gateway. Further, detailed analysis of logs are required to determine relationship between the software and the hardware logs to identify processes within the software which cause the performance issues (e.g., consuming more memory or disk space, utilizing more CPU, taking more time to execute, etc.). Therefore, the logs analysis is a time consuming and an arduous task. As the logs analysis is time consuming and arduous task, usually, the logs analysis is performed reactively, e.g., when some performance issues are identified at the IoT gateway.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DESCRIPTION

Figure 1:
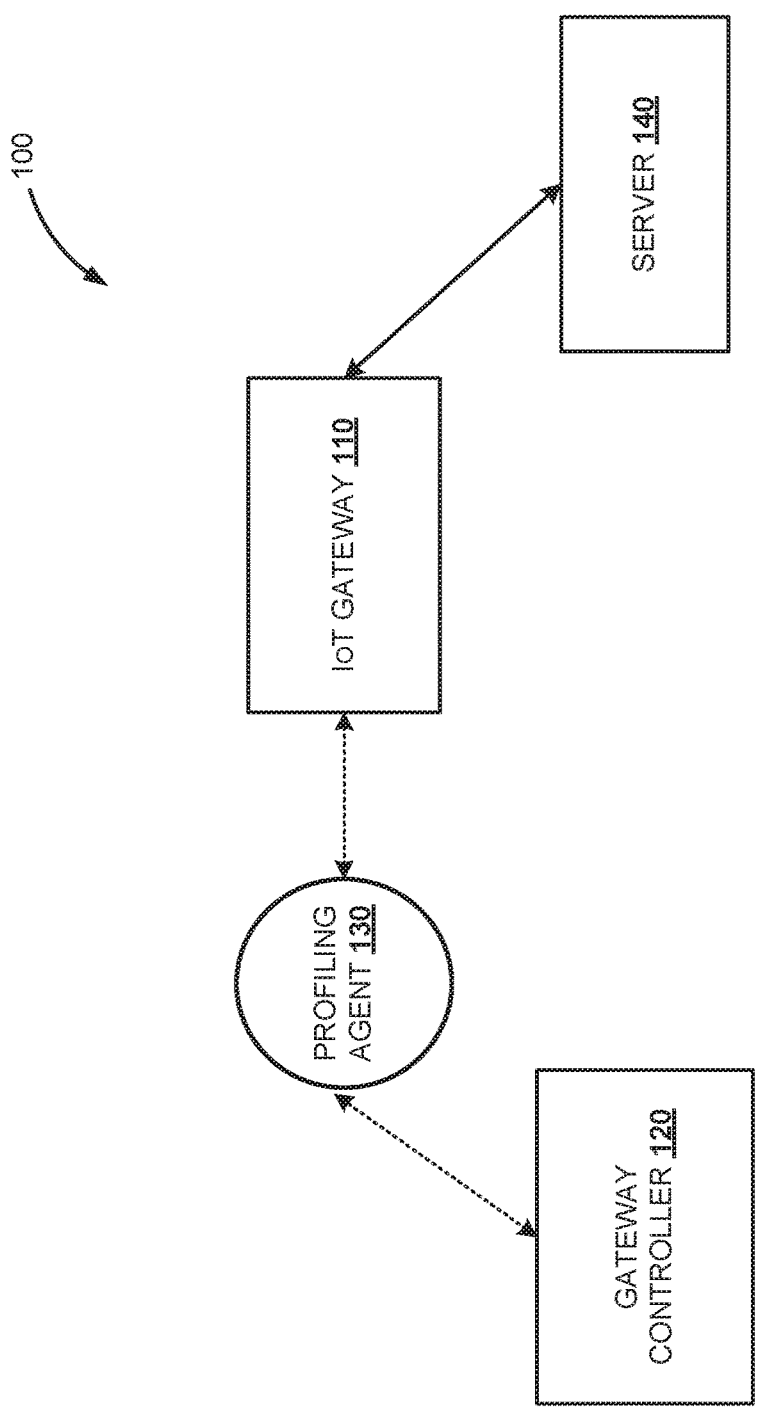
FIG. 1 is a block diagram illustrating system comprising a gateway controller for monitoring and controlling an internet of things (IoT) gateway, according to an embodiment.

Embodiments of techniques for monitoring IoT gateways are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Device" or "Thing" refers to a logical and/or a physical unit adapted for a specific purpose. For example, a device may be at least one of a mechanical and/or an electronic unit. Device encompasses, but is not limited to, a communication device, a computing device, a handheld device, and a mobile device such as an enterprise digital assistant (EDA), a personal digital assistant (PDA), a tablet computer, a smartphone, and the like. A device can perform one or more tasks. The device includes computing system comprising electronics (e.g., sensors) and software. The device is uniquely identifiable through its computing system. The device can access internet services such as World Wide Web (www) or electronic mails (E-mails), and exchange information with another device or a server by using wired or wireless communication technologies, such as Bluetooth, Wi-Fi, Universal Serial Bus (USB), infrared and the like.

"Internet of Things" or IoT refers to a network of devices or "things" connected to exchange data with users and/or other connected devices. The IoT enables transfer or exchange of data over a network without requiring human-to-human interaction. Amount of data exchanged through IoT (i.e., IoT data) is voluminous, e.g., real time data in cloud environment. The data may be time-stamped (e.g., time series data) and/or geo location stamped data. The data may be received from the device in real-time or at a predefined time intervals.

"IoT device" refers to a device within the IoT. Data is created or collected by an IoT device. For example, an automobile (IoT device) may collect its engine temperature (data) through a sensor installed within the automobile. The IoT devices may belong to different categories, e.g., automobile, electronics devices, etc. In an embodiment, IoT devices of the same category (e.g., vehicles) may be termed as a "set of IoT devices." In another embodiment, the IoT devices (e.g., of different categories) communicatively connected for a common purpose (task) may be termed as a "set of IoT devices." For example, a watch, a television, and a fan (i.e., devices of different categories) may be termed as a "set of IoT devices" connected for common purpose of alerting user wearing the watch about television/fan, such that if the television and/or the fan is 'ON,' an alarm may be triggered (blown or flashed) in the watch.

"IoT gateway" refers to a logical and/or a physical unit which is an interface between an on-premise IoT device and cloud. There may be separate IoT gateways (interfaces) for separate sets of IoT devices. The IoT gateway collects data from the IoT devices (e.g., set of IoT devices) and sends the collected data onto the cloud, e.g., for further processing and analysis. The IoT gateway may include software application or program to pre-process (e.g., filter) the collected data prior to sending the data onto the cloud. The pre-processing includes, but not limited to, protocol transformation (e.g., change or translate one protocol or language to another to enable communication between the IoT devices and cloud), data filtering (e.g., filter data collected from the IoT devices based upon filtering parameters provided by a user to send relevant data onto the cloud), and stream processing (e.g., classify collected data or data packets based upon various fields included within the data packet such as header/footer). The IoT gateway may be monitored, e.g., by monitoring its CPU utilization, disk space utilization, memory consumed, execution time of the software application and/or one or more processes within the software application of the IoT gateway, CPU or disk utilization by the software application and/or the one or more processes, etc. The IoT gateway may be monitored proactively (periodically or regularly) and/or reactively (upon detecting some issues).

"IoT gateway attribute" or "gateway attribute" refers to a parameter which indicates performance of software application and/or one or more processes within the software application of the IoT gateway. In an embodiment, the performance of the software application and/or the one or more processes within the software application may be relative to at least one of: (i) hardware utilization within the IoT gateway (e.g., the CPU, the disk, and the memory utilization or consumption by the software application and/ or the one or more processes within the software application); (ii) one or more calls (requests) received at the IoT gateway (e.g., number of requests received at the IoT gateway which are executed by the software application within specified timeline and number of requests received at the IoT gateway which are not executed within the specified timeline); and (iii) one or more requests made from the IoT gateway to the cloud (e.g., number of calls or requests from the software application which are executed by the cloud or server within specified timeline and number of calls or requests from the software application which are not executed within the specified timeline). In an embodiment, the gateway attribute includes, but not limited to: (i) latency profile (e.g., may be in a form of text or graph) which indicates percentage (%) of requests or calls made by the software application (IoT gateway) to the cloud or server which are being executed within predefined or specified timeline and the percentage (%) of requests which are not executed within the predefined or specified timeline; (ii) latency profile for input/output operations per second (IOPS) which indicates percentage (%) of requests made by the software application to internal disk or database (within the IoT gateway) which are being executed within predefined timeline and the percentage (%) of requests which are not executed within the predefined timeline; (iii) call graph or flame graph which indicates the details of calls or requests (e.g., time taken by the call to invoke another call or to get response from the database or disk, the % of CPU or memory utilization by the call, etc.) from the IoT gateway software application to IoT gateway hardware; (iv) thread or process status which indicates status of process within the software application such as whether the process is executing, waiting on the network, blocked or stuck (e.g., not getting response from disk, database, server, etc.); (v) number of objects created (memory utilization) by a process; and (vi) connections open to database (DB) which indicates percentage (%) of database being captured by one or more processes within the software application. The gateway attribute may be represented or rendered in one of a graphical format, textual format, and tabular format.

"Profiling agent" refers to a logical component (e.g., code) which captures one or more gateway attributes. The profiling agent may be inserted within a software application and/or a process included within the software application of the IoT gateway to capture one or more gateway attributes. The profiling agent may be inserted dynamically on-demand when required (e.g., on user's command) or may be inserted automatically, e.g., periodically or at a predefined (regular) time interval. Once inserted, the profiling agent captures the one or more gateway attributes. In an embodiment, the profiling agent also captures hardware attributes indicating CPU utilization, disk utilization, memory utilization, (e.g., in percentage) by various processes included within the software application. The captured gateway attributes and/or the hardware attributes may be transferred onto the cloud for further analysis, e.g., to identify the processes causing performance issues to improve the software application and the IoT gateway performance.

"Gateway controller" refers to a logical and/or a physical unit which controls the IoT gateway. The gateway controller may include a graphical user interface (GUI) and can be accessed through internet from anywhere, e.g., to control the IoT gateway and analyze its performance. The gateway controller also controls the profiling agent. For example, the gateway controller automatically or on-demand (e.g., based on user's command) attach or insert the profiling agent to the IoT gateway to capture the one or more gateway attributes. The captured gateway attributes is rendered by the gateway controller, e.g., on a user interface (UI). In an embodiment, the gateway controller renders the captured gateway attributes upon receiving a command from the user. In an embodiment, the gateway controller may render or email the captured attributes automatically and periodically to the user. In an embodiment, the gateway controller may provide an option to the users to operate the IoT gateway in one of two modes namely: (i) a profile mode; and (ii) a normal mode. In the profile mode, the profiling agent is attached to the software application or processes within the software application of the IoT gateway to capture the gateway attributes to analyze the performance of the IoT gateway. In an embodiment, by default, the profiling agent captures the gateways attributes for the processes included within the software application of the IoT gateway. In normal mode, the profiling agent is detached from the IoT gateway, i.e., the software application attributes and/or the gateway attributes are not captured by the profiling agent. In an embodiment, in the normal mode, the IoT gateway executes code or program to capture basic (abstract level) hardware details such as the CPU, the disk, and the memory utilization by the software application of the IoT gateway.

"In-memory" database refers to a database that relies on main memory for computer data storage. In some examples, the in-memory database includes a combination of main memory and disk storage. Also, the in-memory database may implement analytics and transactional processing including replication and aggregation techniques to be performed real-time or near real-time. Also, within the in-memory database environment, calculation logic may be pushed down into the database layer (as opposed to residing in the application layer) such that the processing time for querying and manipulating the data within the database may be reduced as compared with conventional relational databases. In some examples, the in-memory database may be HANA® Enterprise 1.0 (or other versions). However, the techniques described herein may be applied to any type of relational database as well.

Embodiments enable capturing comprehensive and detailed information related to various resources (e.g., hardware and software) of an IoT gateway. The information is detailed and comprehensive so that it may be analyzed easily and performance issues may be detected more efficiently. The information (e.g., gateway attributes) includes the hardware or kernel information (e.g., CPU utilization, memory consumption, etc.) in relation to the software application or processes executing within the IoT gateway. For example, the information provides details about one or more processes within the software application which are utilizing more disk space, consuming more memory, etc. Therefore, the information enable users to quickly and easily (without performing time consuming in-depth analysis) identify the processes within the software application which may be causing performance issues at the IoT gateway. The information may be captured proactively (periodically) or reactively (upon detecting some issues). The information may be captured by inserting profiling agent to the software application and/or the one or more processes within the software application of the IoT gateway. The profiling agent may be inserted automatically (e.g., at regular/predefined time interval) or on-demand (e.g., upon receiving user's command) to capture the information. The information includes various software and gateway attributes, including but not limiting to, execution time of one or more processes, latency profile, latency profile for input/output operations per second (IOPS), call graph, process status, etc. Based upon the information, the software application or processes consuming more hardware or kernel resources (e.g., CPU, memory, disk, etc.) may be identified. The identified processes may be updated/revised to optimize the use of IoT gateway resources (i.e., hardware or kernel resources) to enable the IoT gateway perform efficiently. As more detailed information or attributes (e.g., gateway attributes such as latency profile, latency profile for IOPS, call graph, process status, etc.) are captured at the kernel level (which usually is not provided by logs), it helps to improve or enhance the software application of the IoT gateway so that optimal IoT gateway resources (kernel resources) may be utilized by the software application. Further, as the profiling agent is inserted within the software application or processes on demand (e.g., when required) and is not permanently embedded within the IoT gateway, the memory/storage space of the IoT gateway is saved. In various embodiments, a software application may be installed at data entry point of the IoT gateway to filter and send more refined (relevant) data to the IoT gateway kernel to further optimize kernel (e.g., operating system or OS) processing time and use of kernel resources (e.g., CPU utilization).

FIG. 1 is a block diagram illustrating exemplary system 100 for monitoring IoT gateway 110 through gateway controller 120, according to an embodiment. The gateway controller 120 may be browser based through which the IoT gateway 110 may be accessed and controlled from anywhere. The gateway controller 120 may include a user interface or UI (not shown) providing an option to operate the IoT gateway 110 in one of a normal and a profile mode. When the profile mode is selected, the gateway controller 120 attaches profiling agent 130 to the IoT gateway 110. In an embodiment, attaching the profiling agent 130 to the IoT gateway 110 refers to inserting or dynamically adding the profiling agent 130 to software application or processes installed within the IoT gateway 110. The software application or processes may be installed for executing pre-processing operations on data collected from one or more IoT devices. Once the profiling agent 130 is attached to the IoT gateway, the profiling agent 130 starts capturing software and/or gateway attributes. The software and/or gateway attributes may indicate software application or processes performance relative to the hardware or kernel of the IoT gateway 110. For example, the gateway attribute "call graph or flame graph" indicates in detail about the CPU, the disk, or the memory utilization by the software application or the one or more processes executing within the software application. In an embodiment, a time period may be scheduled to automatically attach the profiling agent 130 to the IoT gateway 110 to capture the gateway attributes automatically at regular (predefined) time interval. The periodic captured gateway attributes may be transferred from the IoT gateway 110 to server 140 for analysis. Typically, based upon the captured gateway attributes, the software application and/or the processes within the IoT gateway may be enhanced to optimize the utilization of hardware or kernel resources of the IoT gateway. Once the software application and/or the processes are enhanced, the IoT gateway 110 can more efficiently handle requests from one or more IoT devices.

The IoT gateway 110 may be communicatively coupled to one or more IoT devices. In an embodiment, the one or more IoT devices may belong to same category (e.g., vehicles or cars) and/or the one or more IoT devices may be connected for a common purpose (e.g., a watch, a television, and a fan may be connected so as to alert a user in case the television or the fan is 'ON,' e.g., by triggering an alarm on the user's watch). The IoT devices of the same category and the IoT devices connected for a common purpose may be termed as "a set of IoT devices." The IoT gateway 110 may be communicatively coupled to a set of the IoT devices (not shown). In an embodiment, there may be separate IoT gateway for separate set of IoT devices. In another embodiment, there may be single IoT gateway for different sets of IoT devices.

Figure 2:
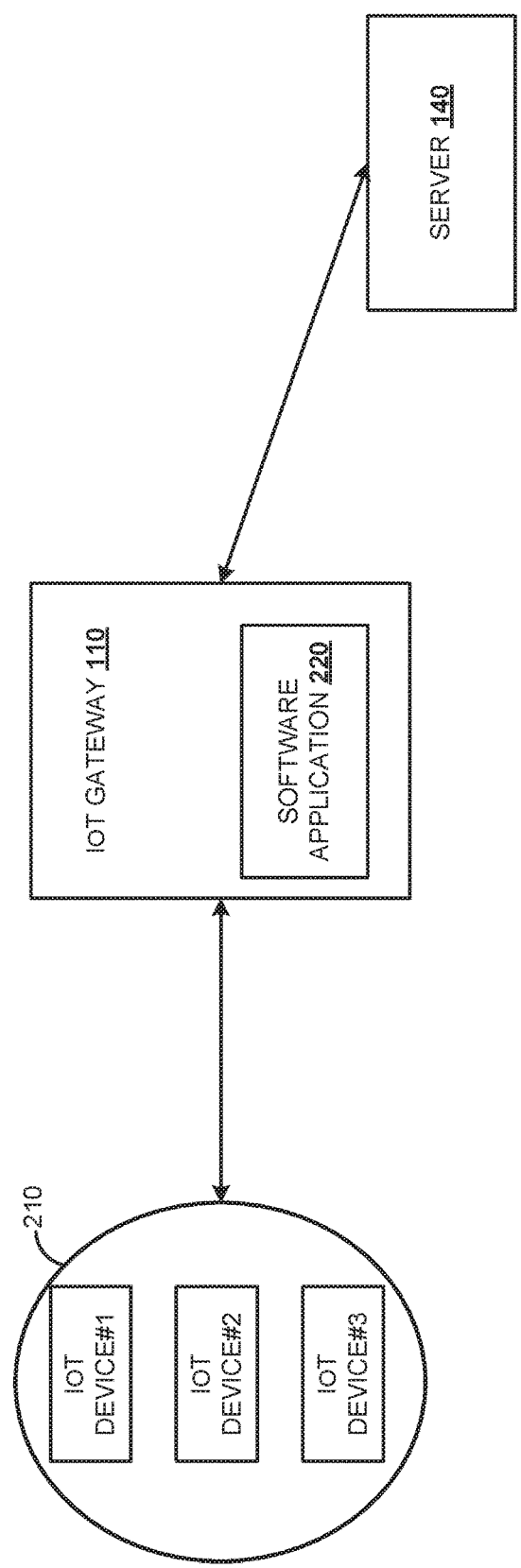
FIG. 2 is a block diagram illustrating the IoT gateway connected to a set of IoT devices for collecting IoT data, according to an embodiment.

FIG. 2 illustrates a set of IoT devices 210 communicatively connected to the IoT gateway 110, according to an embodiment. The set of IoT devices 210 may comprise IoT device#1, IoT device#2, and IoT device#3. In an embodiment, the IoT device#1, IoT device#2, and IoT device#3 may be devices of same category (e.g., may be cars). In another embodiment, the IoT device#1, IoT device#2, and IoT device#3 may be devices of different category communicatively connected for a common purpose. The data from the IoT device#1, IoT device#2, and IoT device#3 may be captured or collected by the IoT gateway 110. In an embodiment, the IoT device#1, IoT device#2, and IoT device#3 may be configured to send data (in real-time or periodically) to the IoT gateway 110. For example, if the IoT device#1, IoT device#2, and IoT device#3 are cars comprising sensors (e.g., temperature measuring sensors for measuring temperature of car engine), the IoT device#1, IoT device#2, and IoT device#3 may be configured to periodically send the value of engine temperature (data) of respective cars to the IoT gateway 110. In an embodiment, the IoT gateway 110 may itself collects the engine temperature (data) from the IoT device#1, IoT device#2, and IoT device#3. For example, the IoT gateway 110 may, periodically, requests the respective sensors to provide engine temperature of the respective cars or the IoT devices (e.g., the IoT device#2, and IoT device#3). In an embodiment, the data to be sent to the IoT gateway 110 by the IoT devices (e.g., the IoT device#2, and IoT device#3) may be predefined. For example, if the IoT device#1 is a "fan" it may be predefined that the device#1 sends data, e.g., its status (ON/OFF) to the IoT gateway 110 at every 1 hour.

Once the data is collected or received by the IoT gateway 110, software application 220 at the IoT gateway 110 processes the data (e.g., filter the data). The data may be processed, e.g., based upon predefined logic or parameter provided by a user. The logic or parameter (e.g., filtering parameter) may be configured or predefined dynamically, during runtime, through the gateway controller 120 (FIG. 1). For example, the gateway controller 120 may provide an UI for predefining or configuring the logic and/or parameter. In an embodiment, the logic or parameter may be configured in structured query language (SQL). For example, the logic (e.g., to filter data) may be configured as "SELECT data whose value (engine_temperature)>360° Centigrades." The filtered and/or processed data is sent from the IoT gateway 110 to the server 140 for further processing and analysis.

The performance of the IoT gateway 110 (e.g., performance of the software application 220 within the IoT gateway 110) may be monitored through the gateway controller 120 (FIG. 1). The IoT gateway 110 may be monitored, continuously or periodically, to determine if there are any performance issues at the IoT gateway 110. Typically, the gateway attributes are captured, continuously or periodically, to determine if there are any performance issues at the IoT gateway 110. The performance issues may be due to the software 220 executing on the IoT gateway 110. For example, one or more processes within the software application 220 may not be using the IoT gateway 110 hardware or kernel resources optimally (efficiently) due to which the IoT gateway 110 may have performance or bottleneck issues. The software application may be upgraded or revised to combat or scale down the performance or bottleneck issues. In an embodiment, the performance issues may be due to network, hardware, or kernel resources, still, the software application may be upgraded to scale down network, hardware, or kernel issues. For example, the requests from the software application of the IoT gateway 110 may not get processed in estimated timeframe due to network issues (e.g., network gets blocked due to large number of requests or calls made to the cloud or the server 140), now, the software application may be upgraded to reduce the number of calls or request to the cloud and/or to send the requests in batches, etc., to combat the network issues. Therefore, to combat the performance issues and to upgrade the software application 220, the IoT gateway 110 may be required to be monitored from time to time.

The IoT gateway 110 may be monitored through the gateway controller 120 (FIG. 1). Usually, the gateway controller 120 provides an UI (not shown) to operate the IoT gateway 110 in one of a normal and a profile mode. When the IoT gateway 110 is operated in the profile mode (i.e., when the profile mode is selected from the UI), the performance of the IoT gateway 110 may be measure through the profiling agent 130 (FIG. 1). In an embodiment, once the profile mode is selected, the gateway controller 120 connects or attach the profiling agent 130 to the IoT gateway 110 (e.g., to the software application 220 of the IoT gateway 110). In an embodiment, the user may configure, through the UI, to automatically attach the profiling agent 130 to the software application 220 regularly at predefined time-period. In an embodiment, the gateway controller 120 displays the software application and processes executing on the IoT gateway 110 and the user may manually select the software application/processes which are to be attached to the profiling agent 130 or which are to be monitored by the profiling agent 130. In an embodiment, the software application or processes whose IDs are selected by the user would be attached to the profiling agent 130. In an embodiment, when a software application is selected, the one or more processes executing within the software application are monitored and attached to the profiling agent 130.

In an embodiment, a command may be provided to attached the profiling agent 130 to a software application or a process executing within the software application. For example, if a process has an ID (i.e., process ID or PID) "129876", the command may be provided as "attach PID 129876through the UI of the gateway controller 120. Once the command is provided, the profiling agent 130 gets attached to the process (PID=129876). In an embodiment, attaching the profiling agent 130 to the process refers to inserting the profiling agent 130 into the process to capture the performance of the process, e.g., execution time of the process. In an embodiment, when a software application ID is provided (i.e., attach SID 1674569), the one or more processes executing within that software application are monitored and attached to the profiling agent 130.

Once the profiling agent 130 is attached to the software application or process, the profiling agent 130 captures various gateway attributes relative to that software application or process. In an embodiment, the profiling agent 130 captures hardware or kernel utilization of the IoT gateway 110 relative to the execution of the software application or the process to which it is attached. In an embodiment, the profiling agent 130 measures the performance of the software application or the process by measuring time taken by the software application or the process to execute the calls (requests) from one or more IoT devices (e.g., IoT device#1, IoT device#2, and IoT device#3 of FIG. 2). For example, the profiling agent may determine the number of requests which are executed by the software application or the process within specified timeline and number of requests which are not executed within the specified timeline. Similarly, various other gateway attributes (indicating the performance of the software application or processes executing within the IoT gateway 110) is captured. For example, gateway attributes such as the latency profile indicating percentage (%) of requests or calls made by the software application (i.e., IoT gateway 110) to the cloud or server 140 which are being executed/not executed within predefined or specified timeline, latency profile for IOPS indicating percentage (%) of requests made by the software application to internal disk or database (within the IoT gateway) which are being executed/not executed within predefined timeline, call graph or flame graph indicating the details of calls or requests (e.g., time taken by the call to invoke another call or to get response from the database or disk, the % of CPU or memory utilization by the call, etc.) from the IoT gateway software application to IoT gateway hardware, etc., may be captured.

Figure 3:
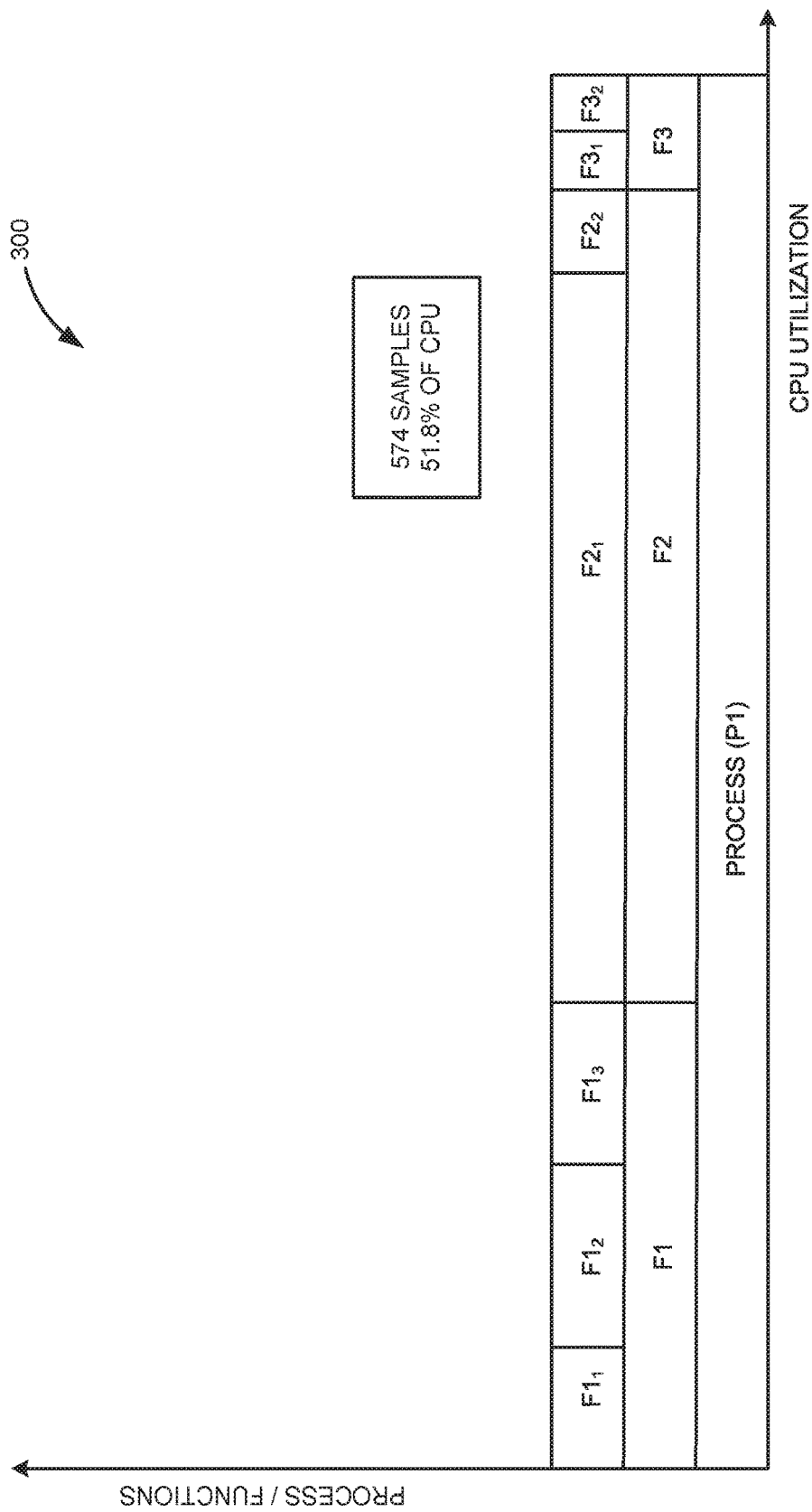
FIG. 3 is a block diagram illustrating a call graph for a process executing within the IoT gateway relative to CPU utilization of the IoT gateway, according to an embodiment.

FIG. 3 illustrates an exemplarily call graph 300 generated by the profiling agent 130. The call graph 300 indicates CPU utilization of the IoT gateway 110 relative to process P1 executing within the IoT gateway 110. The process P1 may invoke other processes or functions. As illustrated, CPU utilization is depicted on x-axis and processes/functions executing within the IoT gateway 110 and utilizing the CPU are depicted on y-axis. In an embodiment, there may be separate call graphs for CPU utilization, disk utilization, network utilization, memory consumption, etc. In an embodiment, the call graph for disk utilization, network utilization, memory consumption, etc., may be termed as "off CPU" call graph. The process P1 may comprise functions F1, F2, and F3 (shown as three blocks above the process P1). In an embodiment, the process P1 comprising functions refers to the process P1 invoking functions. The functions may further invoke or call sub-functions. For example, function F1 may invoke sub-functions $F1_1$, $F1_2$, $F1_3$ (shown as three blocks above the function F1), function F2 may invoke sub-functions $F2_1$ and $F2_2$ (shown as two blocks above F2), and function F3 invokes sub-function $F3_1$ and $F3_2$. The sub-functions $F1_1$, $F1_2$, $F1_3$, $F2_1$, $F2_2$, $F3_1$ and $F3_2$ may further invoke sub-functions and so on, (not illustrated for simplicity purpose). The length of the process/function/sub-function block on the x-axis is proportion to the percentage (%) of the CPU utilized. Therefore, the user can easily make out by glancing at the call graph the process or function(s) which are consuming more CPU. For example, from the call graph 300, the user may easily make out that the sub-function $F2_1$ utilizes more CPU. The user may hover over the identified block (e.g., the block of the sub-function $F2_1$) to view more details on CPU utilization. In an embodiment, when the user hovers over the block (process/function/sub-function), details such as percentage (%) of CPU utilization by that process/function/sub-function is displayed in an embodiment, number of samples (i.e., number of times that process/function/sub-function is being executed by the CPU) is also displayed. For example, as illustrated in FIG. 3, when the user hovers over the block or sub-function $F2_1$ details such as "574 samples; 51.8% of CPU" is displayed indicating that the sub-function $F2_1$ is being executed 574 times and is using 51.8% of the CPU. In an embodiment, the blocks indicating processes, functions, sub-functions, etc., may be color coded. For example, the block for the process, function, sub-function which are consuming more CPU time than expected, may be indicated in "RED" color and the block for the process, function, sub-function which are consuming predefined or expected CPU time may be indicated in "GREEN" color. The user may analyze or check the code of the sub-function $F2_1$ to identify or determine the reason why the sub-function $F2_1$ is consuming more CPU. Based upon the analysis, the user may revise or enhance the code of the sub-function $F2_1$ so that the sub-function $F2_1$ may optimally use the CPU. In an embodiment, another call graph for disk utilization, memory consumption, etc., may also be generated.

Figure 4:
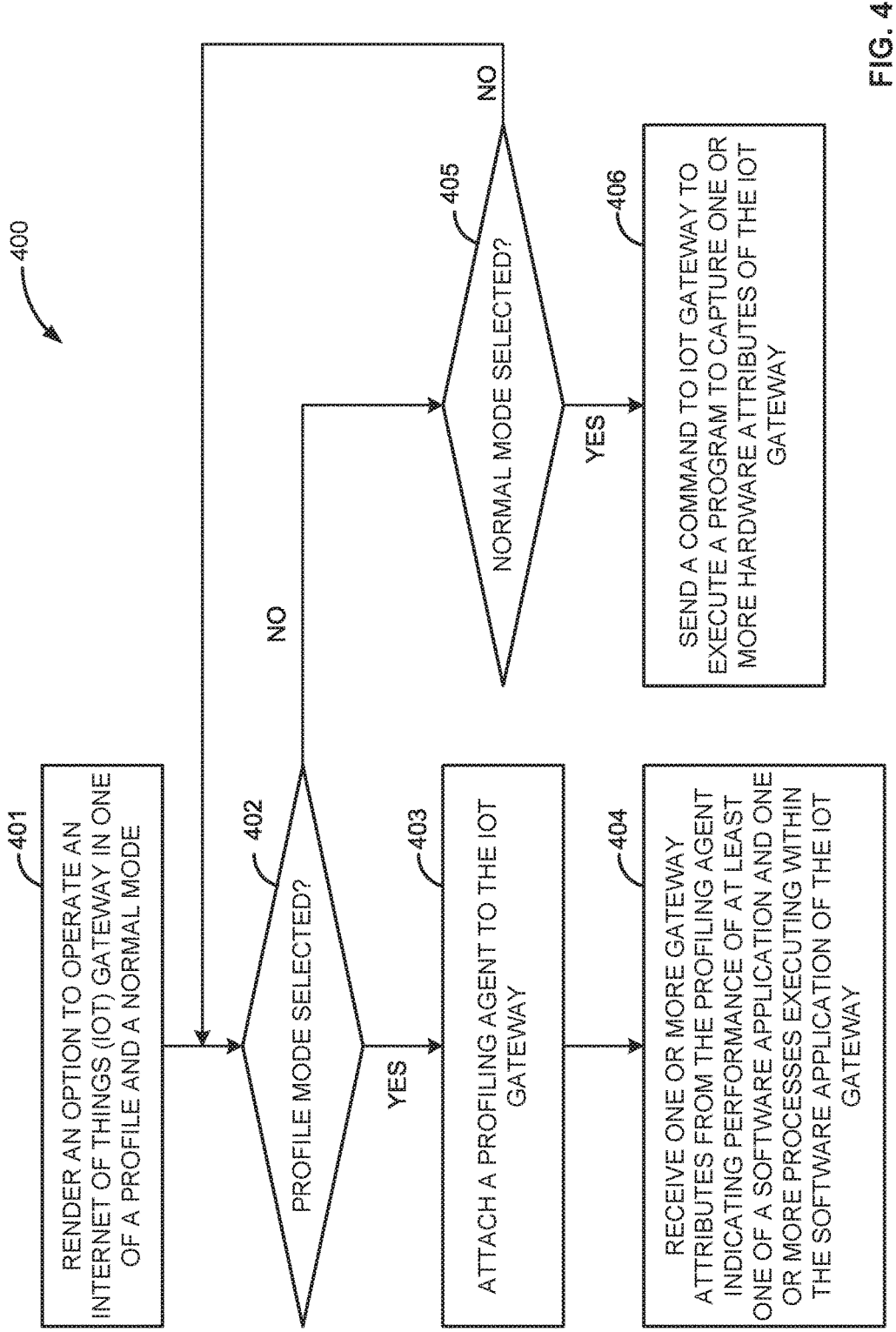
FIG. 4 is a flowchart illustrating method for monitoring an IoT gateway, according to an embodiment.

FIG. 4 is a flowchart illustrating process 400 to monitor internet of things (IoT) gateways (e.g., the IoT gateway 110 of FIG. 1), according to an embodiment. At 401, an option to operate an IoT gateway in one of a profile and a normal mode is rendered. In an embodiment, the option may be rendered on UI of gateway controller (e.g., the gateway controller 120 of FIG. 1). At 402, it is determined whether the option to operate the IoT gateway in the profile mode is selected. When the option to operate the IoT gateway in the profile mode is selected (402: YES), a profiling agent (e.g., the profiling agent 130 of FIG. 1) is attached to the IoT gateway at 403. Once the profiling agent is attached to the IoT gateway, the profiling agent starts capturing one or more gateway attributes. In an embodiment, the one or more gateway attributes indicates performance of at least one of a software application and one or more processes executing within the software application of the IoT gateway. The performance of the software application and/or the one or more processes may be: (i) relative to hardware/or and kernel utilization of the IoT gateway; (ii) relative to one or more requests received at the IoT gateway from one or more IoT devices; and/or (iii) relative to one or more requests made from the IoT gateway to a server or cloud. For example, a latency profile for IOPS indicates performance of the software application and/or the one or more processes relative to hardware/or and kernel utilization of the IoT gateway. At 404, the one or more gateway attributes indicative of the performance of the software application and/or the one or more processes executing within the software application of the IoT gateway is received from the profiling agent. The received gateway attributes may be analyzed to evaluate and enhance the performance of the IoT gateway. In an embodiment, the gateway attributes may be received at a gateway controller (e.g., the gateway controller 120 of FIG. 1). In an embodiment, the gateway attributes may be received at cloud or server (e.g., the server 140 of FIG. 1). When the profile mode is not selected (402: NO), it is determined whether the option to operate the IoT gateway in normal mode is selected at 405. When the option to operate the IoT gateway in normal mode is selected (405: YES), a command is sent to the IoT gateway to execute a program to capture one or more hardware attributes of the IoT gateway at 406. The one or more hardware attributes include at least one of a percentage of central processing unit (CPU) utilization, a percentage of disk utilization, and a percentage memory utilization by the software application. Therefore, in normal mode, generic hardware attributes of the IoT gateway is captured to broadly analyze the performance of the IoT gateway and if there seems to be any performance issues, the IoT gateway may then be executed in the profile mode to investigate the more detailed/specific cause of the performance issues.

Figure 5:
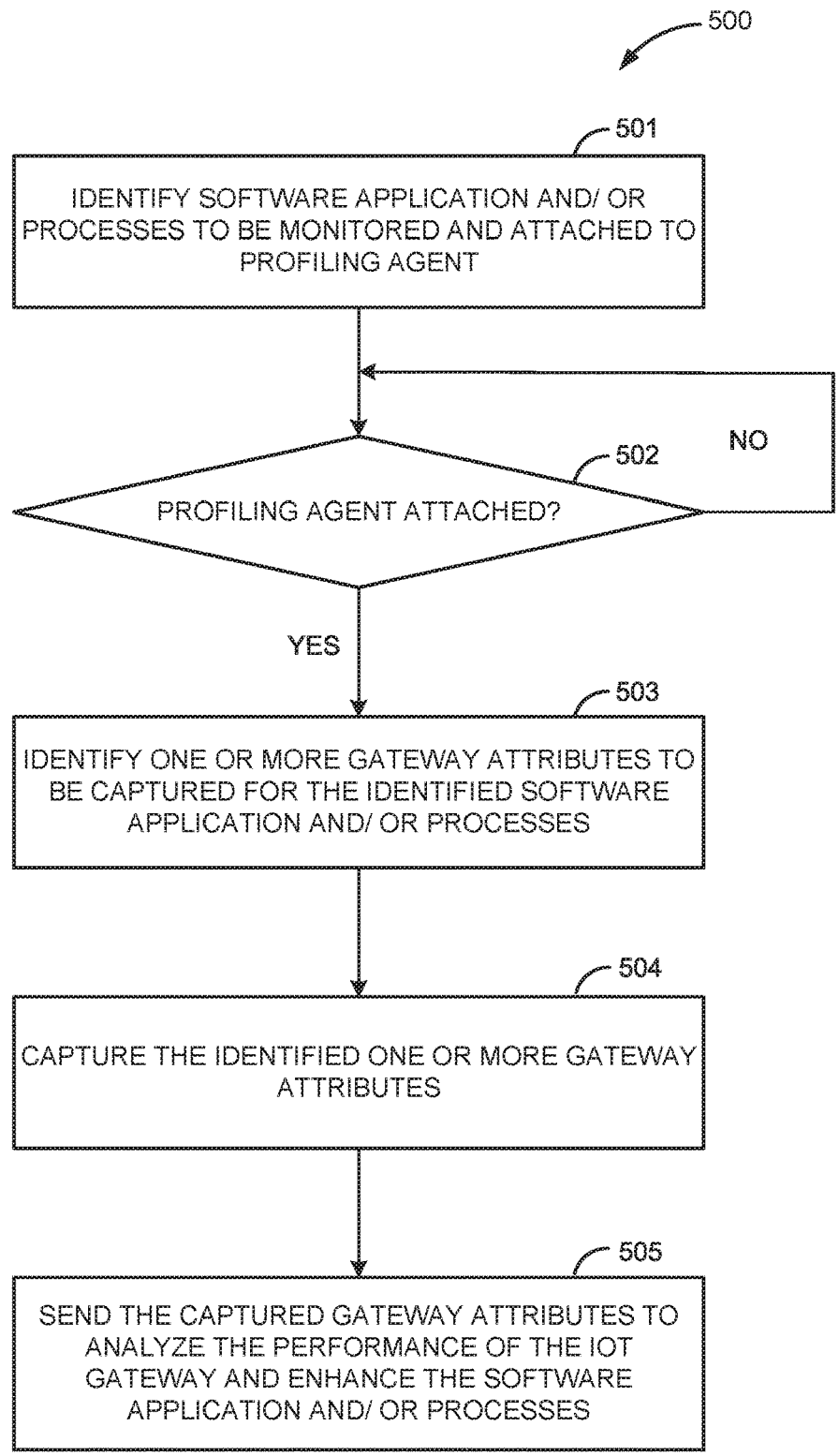
FIG. 5 is a flowchart illustrating method for monitoring an IoT gateway in a profile mode, according to an embodiment.

FIG. 5 is a flowchart illustrating process 500 to monitor the IoT gateway in a profile mode, according to an embodiment. In the profile mode, the IoT gateway is monitored through a profiling agent (e.g., the profiling agent 130 of FIG. 1). At 501, software application and/or processes to be monitored, i.e., to be attached to the profiling agent is identified. In an embodiment, the software application and/or processes to be monitored is identified from the command provided by the user (e.g., the command to attach the software application and/or processes to the profiling agent). At 502, it is determined if the profiling agent is attached to the identified software application and/or processes. In case the profiling agent is attached to the identified software and/or processes (502: YES), one or more gateway attributes to be captured for the identified software application and/or processes is identified at 503. At 504, the identified one or more gateway attributes are captured by the profiling agent. At 505, the captured gateway attributes is sent to at least one of: (i) cloud or server; and (ii) the gateway controller, for further analysis, to enhance the software application and/or processes executing within the IoT gateway. For example, by analyzing the gateway attribute "latency profile" (stating: 90% of the requests from the software application of the IoT gateway 110 to the cloud are not processed in estimated timeframe) it may be inferred that there may be network issues (e.g., network gets blocked due to large number of requests or calls made to the cloud or the server). Based upon the analysis, the software application may be upgraded to reduce the number of calls or request to the cloud and/or may be revised to send the requests in batches e.g., to combat the network issues.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
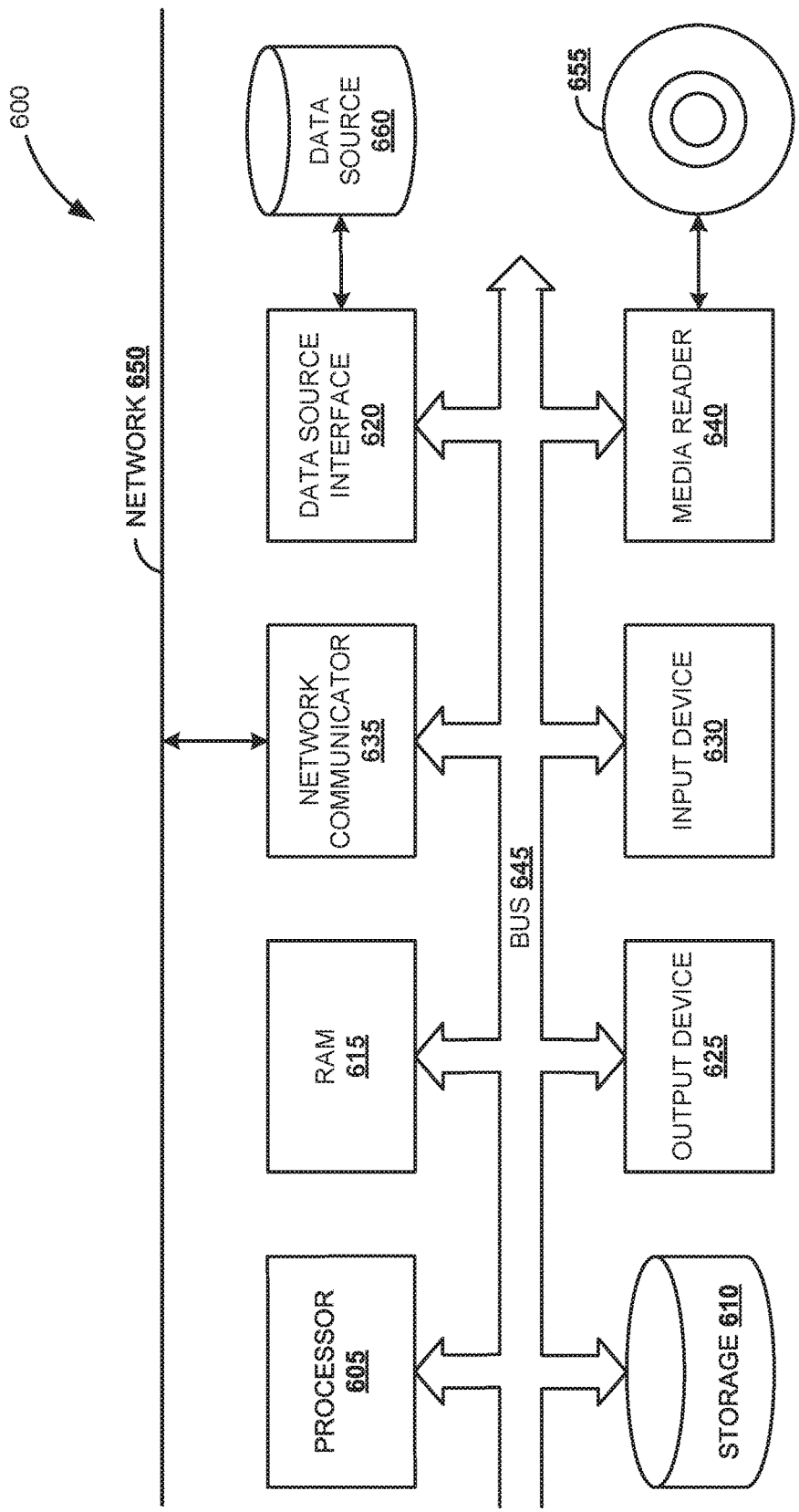
FIG. 6 is a block diagram illustrating an exemplary computer system, according to an embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, the data required for processing mass be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. The output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer A data source is an information resource. Data sources include sources of data that enable data storage and retrieval. Data sources may include databases, such as, relational, transactional, hierarchical, multi-dimensional (e.g., (OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer-readable medium to store instructions, which when executed by a computer, causes the computer to:
    render an option to operate an internet of things (IoT) gateway in one of a profile and a normal mode;
    upon determining selection to operate the IoT gateway in the profile mode:
        attach a profiling agent to the IoT gateway; and
        receive one or more gateway attributes from the profiling agent, wherein the one or more gateway attributes indicate performance of at least one of a software application and one or more processes executing within the software application of the IoT gateway;
    and
    upon determining selection to operate the IoT gateway in the normal mode:
        send a request to the IoT gateway to capture one or more hardware attributes of the IoT gateway, wherein the one or more hardware attributes indicate hardware utilization of the IoT gateway; and
        receive the one or more hardware attributes of the IoT gateway to analyze performance of the IoT gateway.

2. The non-transitory computer readable medium of claim 1, wherein the received one or more gateway attributes are sent to a server or cloud for analysis.

3. The non-transitory computer readable medium of claim 1, wherein the one or more gateway attributes indicate the performance of at least one of the software application and the one or more processes executing within the software application relative to:
    hardware and kernel utilization of the IoT gateway;
    one or more requests received at the IoT gateway from one or more IoT devices; and
    one or more requests made from the IoT gateway to a server or cloud.

4. The non-transitory computer readable medium of claim 1, wherein a gateway attribute of the one or more gateway attributes comprises one of:
    a latency profile indicative of a percentage of requests or calls made by the software application or the one or more processes within the software application to the cloud or server which are executed or not-executed within predefined timeline;
    a latency profile for input/output operations per second (IOPS) indicative of a percentage of requests from the software application or the one or more processes within the software application to an internal disk or a database within the IoT gateway which are executed or not-executed within a predefined timeline;
    a call graph indicative of at least one of a CPU utilization, memory consumption, and disk utilization relative to the software application or the one or more processes within the software application; and
    a thread or process status indicative of statuses of the one or more processes within the software application, wherein a status indicates whether a process is one of executing, waiting on network, and blocked.

5. The non-transitory computer readable medium of claim 4, wherein the call graph is color coded to indicate at least one process of the one or more processes causing performance issues at the IoT gateway.

6. The non-transitory computer readable medium of claim 1, wherein the one or more gateway attributes are represented in one of a graphical format, textual format, and tabular format.

7. The non-transitory computer readable medium of claim 1, wherein the one or more hardware attributes include at least one of a percentage of central processing unit (CPU) utilization, a percentage of disk utilization, and a percentage memory utilization by the software application.

8. The non-transitory computer readable medium of claim 1, wherein attaching a profiling agent to the IoT gateway refers to inserting the profiling agent within the software application or the one or more processes of the IoT gateway.

9. A computer-implemented method comprising:
    rendering an option to operate an internet of things (IoT) gateway in one of a profile and a normal mode;
    upon determining selection to operate the IoT gateway in the profile mode:
        attaching a profiling agent to the IoT gateway; and
        receiving one or more gateway attributes from the profiling agent, wherein the one or more gateway attributes indicate performance of at least one of a software application and one or more processes executing within the software application of the IoT gateway;
    and
    upon determining selection to operate the IoT gateway in the normal mode:
        sending a request to the IoT gateway to capture one or more hardware attributes of the 16F gateway, wherein the one or more hardware attributes indicate hardware utilization of the IoT gateway; and
        receiving the one or more hardware attributes of the IoT gateway to analyze performance of the IoT gateway.

10. The method of claim 9 further comprising sending the one or more gateway attributes to a server or cloud for analysis.

11. The method of claim 9, wherein attaching a profiling agent to the IoT gateway refers to inserting the profiling agent within the software application or the one or more processes of the IoT gateway.

12. A computer system comprising:
    at least one memory to store executable instructions; and
    at least one processor communicatively coupled to the at least one memory, the at least one processor configured to execute the executable instructions to:
        render an option to operate an internet of things (IoT) gateway in one of a profile and a normal mode;
        upon determining selection to operate the IoT gateway in the profile mode:
            attach a profiling agent to the IoT gateway; and
            receive one or more gateway attributes from the profiling agent, wherein the one or more gateway attributes indicate performance of at least one of a software application and one or more processes executing within the software application of the IoT gateway;
        and
        upon determining selection to operate the IoT gateway in e normal mode:
            send a request to the IoT gateway to capture one or more hardware attributes of the IoT gateway, wherein the one or more hardware attributes indicate hardware utilization of the IoT gateway; and
            receive the one or more hardware attributes of the IoT gateway to analyze performance of the IoT gateway.

13. The system of claim 12, wherein the received one or more gateway attributes are sent to a server or cloud for analysis.

14. The system of claim 12, wherein the one or more gateway attributes indicate the performance of at least one of the software application and the one or more processes executing within the software application relative to:
- hardware and kernel utilization of the IoT gateway;
- one or more requests received at the IoT gateway from one or more IoT devices; and
- one or more requests made from the IoT gateway to a server or cloud.

15. The system of claim 12, wherein a gateway attribute of the one or more gateway attributes comprises one of:
- a latency profile indicative of a percentage of requests or calls made by the software application or the one or more processes within the software application to the cloud or server which are executed or not-executed within predefined timeline;
- a latency profile for input/output operations per second (IOPS) indicative of a percentage of requests from the software application or the one or more processes within the software application to an internal disk or a database within the IoT gateway which are executed or not-executed within a predefined timeline;
- a call graph indicative of at least one of a CPU utilization, memory consumption, and disk utilization relative to the software application or the one or more processes within the software application; and
- a thread or process status indicative of statuses of the one or more processes within the software application, wherein a status indicates whether a process is one of executing, waiting on network, and blocked.

16. The system of claim 12, wherein the call graph is color coded to indicate at least one process of the one or more processes causing performance issues at the IoT gateway.

17. The system of claim 12, wherein the one or more gateway attributes are represented in one of a graphical format, textual format, and tabular format.

18. The system of claim 12, wherein the one or more hardware attributes include at least one of a percentage of central processing unit (CPU) utilization, a percentage of disk utilization, and a percentage memory utilization by the software application.

19. The system of claim 12, wherein attaching a profiling agent to the IoT gateway refers to inserting the profiling agent within the software application or the one or more processes of the IoT gateway.

20. The system of claim 12, wherein the received one or more hardware attributes are sent to a server or cloud for further processing and analysis.

* * * * *